United States Patent [19]
Murphy

[11] Patent Number: 5,927,125
[45] Date of Patent: *Jul. 27, 1999

[54] METHODS AND APPARATUS FOR MANUFACTURING HELICAL PRODUCTS

[75] Inventor: Maurice William Murphy, Uppingham, United Kingdom

[73] Assignee: The Morgan Crucible Company PLC, United Kingdom

[ * ] Notice: This patent is subject to a terminal disclaimer.

[21] Appl. No.: 08/836,250

[22] PCT Filed: Oct. 24, 1995

[86] PCT No.: PCT/GB95/02511

§ 371 Date: May 2, 1997

§ 102(e) Date: May 2, 1997

[87] PCT Pub. No.: WO96/14176

PCT Pub. Date: May 17, 1996

[30]    Foreign Application Priority Data

Apr. 11, 1995  [PK]  Pakistan .................................. 134726
Apr. 17, 1995  [IN]  India ............................. 688/DEL1995
May 26, 1995  [TH]  Thailand ................................. 026584

[51] Int. Cl.⁶ ............................... B21F 3/02; B21D 5/14; B21D 9/10
[52] U.S. Cl. .................................. 72/135; 72/143; 72/173
[58] Field of Search ............................. 72/135, 136, 137, 72/138, 143, 145, 166, 173; 29/173; 492/35

[56]    References Cited

U.S. PATENT DOCUMENTS

| | | |
|---|---|---|
| 1,914,976 | 6/1933 | Nigro et al. . |
| 2,192,260 | 3/1940 | Fisher et al. . |
| 2,888,726 | 6/1959 | Smith . |
| 2,912,816 | 11/1959 | Kitselman . |
| 3,018,319 | 1/1962 | Quayle . |
| 3,183,658 | 5/1965 | Peterson . |
| 3,195,338 | 7/1965 | Bram . |
| 3,315,509 | 4/1967 | Barlow . |
| 3,646,793 | 3/1972 | Teraoka . |
| 3,739,075 | 6/1973 | Jean et al. . |
| 3,800,397 | 4/1974 | Poffenberger . |
| 4,546,631 | 10/1985 | Eisinger . |
| 4,960,266 | 10/1990 | McDowell et al. . |
| 5,105,642 | 4/1992 | Mohr . |
| 5,217,207 | 6/1993 | Schmader et al. . |
| 5,586,461 | 12/1996 | Murphy . |

FOREIGN PATENT DOCUMENTS

| | | |
|---|---|---|
| 42334/72 | 4/1973 | Australia . |
| 706920 | 7/1931 | France . |
| 714317 | 8/1954 | United Kingdom . |
| 1 976 248 | 11/1967 | United Kingdom . |
| 1135432 | 12/1968 | United Kingdom . |
| WO 96/14176 | 5/1996 | WIPO . |

OTHER PUBLICATIONS

Böhme, Ralph, et al., "144 Fiber All Dielectric Aerial Cable for Railway Applications," Kabel Rheydt AG, published at the International Wire and Cable Symposium, Mönchengladbach, Germany (1996).

*Primary Examiner*—Joseph J. Hail, III
*Assistant Examiner*—Rodney Butler
*Attorney, Agent, or Firm*—Dean W. Russell; Kilpatrick Stockton LLP

[57]    ABSTRACT

Methods and apparatus for forming devices including dead-ends and insulator ties from flat and other strips of material, as well as the devices themselves, are disclosed. Components of these devices may be formed continuously from a single strip, avoiding the need to weld or clamp the components together. Forming the devices in this manner reduces the possibility of stresses or non-uniformities forming when the components are joined and permits continuous automatic or semi-automatic manufacture to occur.

29 Claims, 4 Drawing Sheets

SECTION A-A

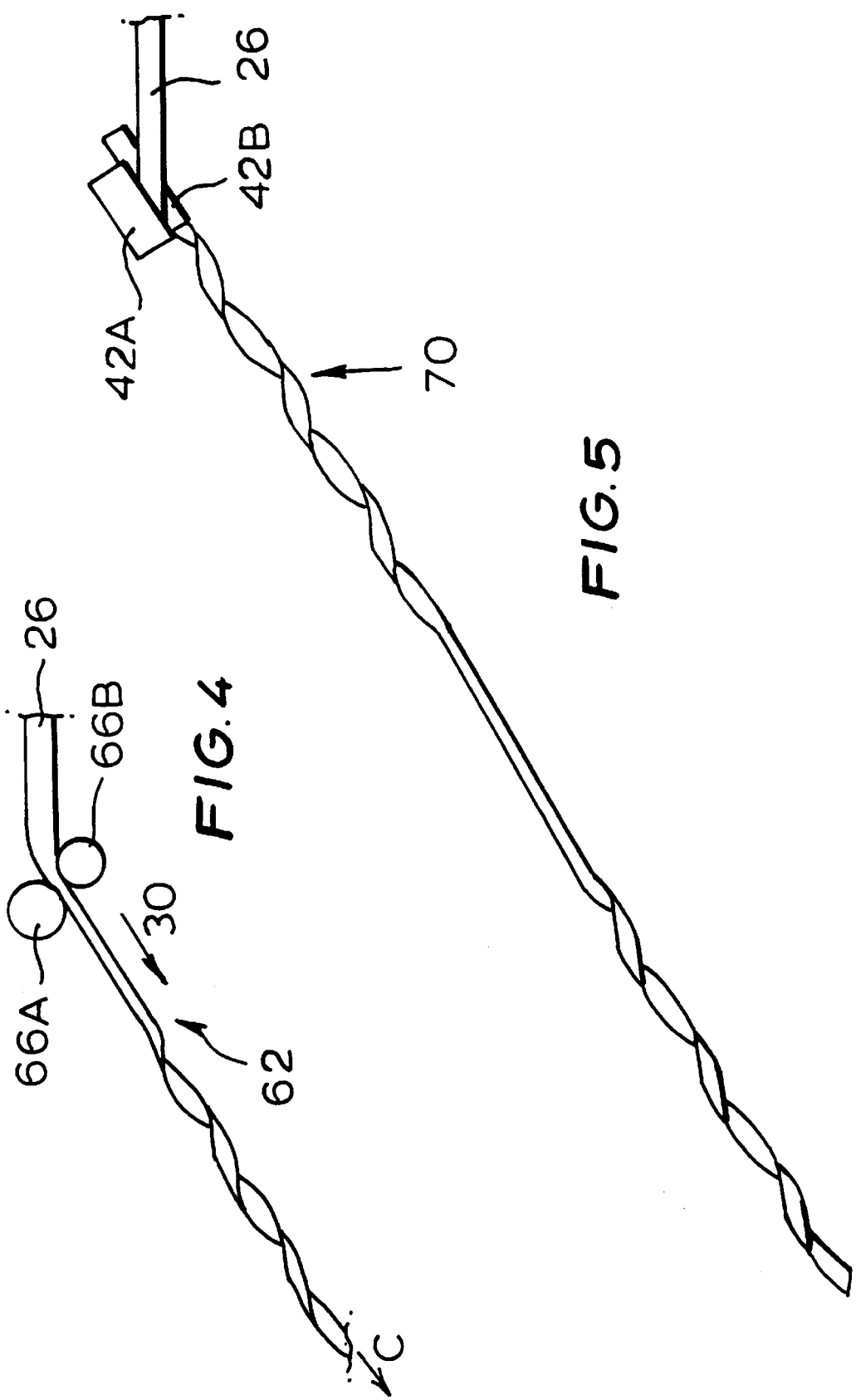

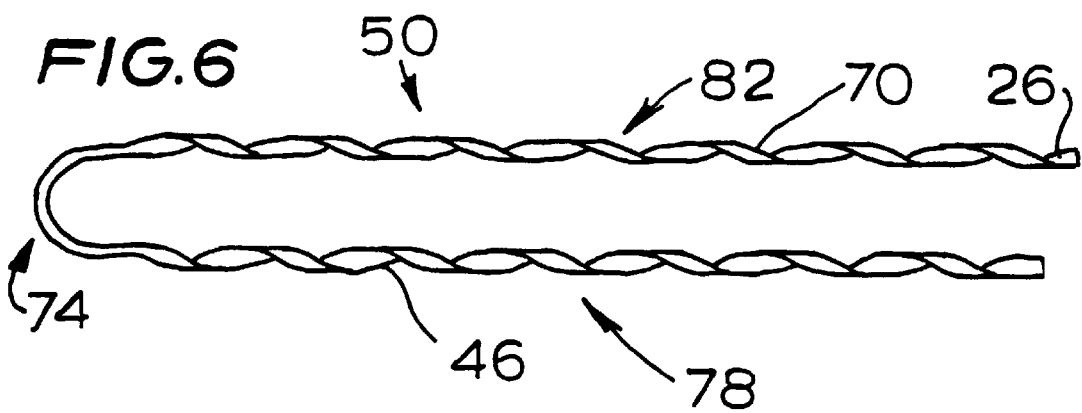
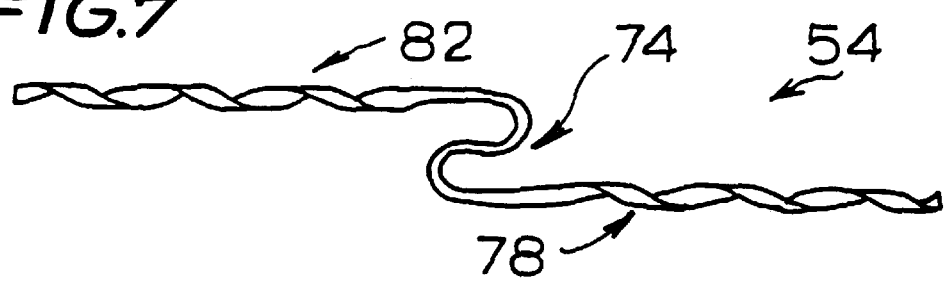
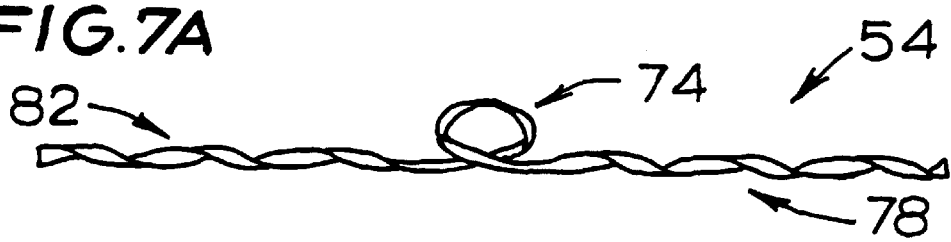
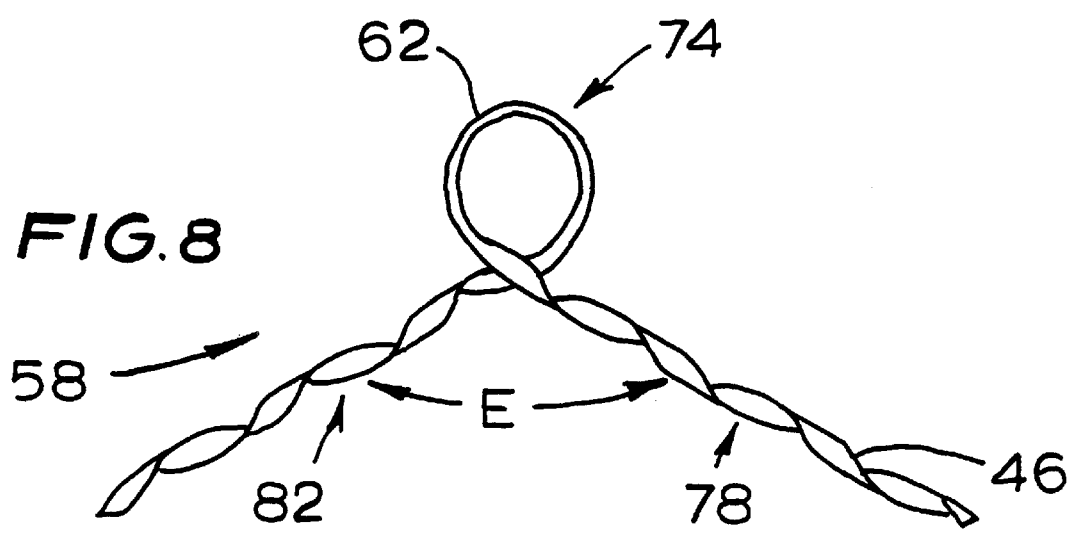

METHODS AND APPARATUS FOR MANUFACTURING HELICAL PRODUCTS

CROSS-REFERENCE TO RELATED APPLICATION

This application is a continuation-in-part of U.S. patent application Ser. No. 08/334,136 (now U.S. Pat. No. 5,586,461), filed Nov. 4, 1994.

This invention relates to methods and apparatus for manufacturing helical products (including but not limited to insulator ties and dead-ends) and to such products themselves.

Conventional helical products such as dead-ends and insulator ties typically consist of sets of wire strands. After the individual strands are formed, they are spiralled and then glued together to form the stranded sets. In many cases grit is then sprayed onto the glued sets to raise their collective coefficient of friction, and portions of each set are thereafter straightened as appropriate to produce the resulting product. This straightening technique can cause the glued strands to detach, however, and the overall formings process is often labor intensive.

U.S. Pat. No. 3,847,491 ("the '491 patent") to Poffenberger discloses other helically preformed dead-ends and "splice-type" appliances for cable and wire installations. According to the '491 patent, the dead-ends may be constructed of either plastic rods or a flat ribbon or strip of material such as steel. Following separate formation of the two helical legs and a U-shaped bight of each dead-end, the three elements are joined by welding or clamping them together. The dead-ends may also contain knurled or gritted surfaces to enhance their ability to grip cables, although no mechanism for knurling the appropriate surfaces is disclosed in either the '491 patent or in U.S. Pat. No. 3,183,658 to which it refers.

U.S. Pat. No. 3,800,397 ("the '397 patent"), also to Poffenberger, addresses a method for making the helical legs and bight of the dead-end. As stated therein, each leg is created by forming an elongated helical strip and then cutting the strip to the desired length. Another continuous strip is formed into "continuous generally sine wave type undulations," with "each individual undulation corresponding to the desired configuration" of the bight of the resulting dead-end. The undulating strip is cut to define multiple bights, one of which may then be joined to the helical legs as noted above to create the dead-end.

As discussed in the '491 and '397 patents. the pitch lengths of the two helical legs differ. In use, the first leg (having longer pitch) is wrapped about a cable, with the second leg thereafter wrapped about both the cable and the first leg. The helixes of the first leg purportedly provide a body of a relatively uniform and more rigid contour for the helixes of the second leg to grip, while the second leg is intended to clamp the surface of the first leg tightly about the cable.

Neither the '491 patent nor the '397 patent contemplates manufacturing both the helical and bight portions of deadends from a continuous strip of material. Similarly, neither patent discloses forming other appliances usefull in connection with cable installations or any mechanism for knurling such appliances in-line. The '491 and '397 patents additionally neither teach nor suggest devices having legs of equal pitch length, each intended to wrap around a conductor or other cable. Instead, as discussed therein, the leg of the dead-end of the '491 and '397 patents having the shorter pitch is wrapped around the other leg to diminish excessive localized radial pressures that otherwise purportedly would occur.

FR-A-706920 discloses apparatus in which strip material is urged to press against selected pairs of rollers disposed at an angle to the direction of travel of the strip material. One of the rollers carries a shoulder against which an edge of the strip material bears. The strip material is deformed by contact with the rollers into the form of a helix.

The present invention provides a method for forming helical sections in strip material, the method comprising the steps of:

a) feeding the strip material in a first direction to contact a pair of forming members;

b) the forming members acting to bend and twist the strip to form a helical section leaving the forming members in a second direction, the degree of bending determining the diameter of the helix and the degree of twisting determining the helical angle of the helix characterised in that c) the strip material passes from one side of the pair of forming members, between the pair of forming members, to exit from the other side of the pair of forming members.

The present invention further provides apparatus for performing the above mentioned method comprising a) means for feeding strip material in a first direction to contact b) a pair of forming members operable to bend and twist the strip to form a helical section leaving the forming members in a second direction, the angle between the first and second directions determining the helical angle of the helical section characterised in that c) the forming members are disposed such that the strip material passes from one side of the pair of forming members, between the pair of forming members, to exit from the other side of the pair of forming members.

Optionally the forming members may comprise spaced rollers with rotational axes angularly disposed to the first direction to lie parallel with the second direction.

The present invention further provides a method of producing helical devices comprising a first helical section, a second non-helical section, and a third helical section, characterised in that the method comprises the steps of:

feeding strip material having integrally formed first second and third sections to an apparatus;

b) within the apparatus automatically activating helix forming means to form the first section into the shape of a helix;

c) within the apparatus automatically inactivating the helix forming means so as not to form the second section into the shape of a helix, d) within the apparatus automatically activating the helix forming means so as to form the third section into the shape of a helix e) cutting the first section, second section, and third section from the strip material to form a first helical device; and f) repeating steps a)–e) to form a second helical device.

This invention thereby provides alternative methods and apparatus for forming helical devices of many types (including dead-ends and insulator ties). Unlike the devices of the '491 and '397 patents, the components of the devices of the present invention may be formed continuously from a single strip rather than separately manufactured. Doing so avoids the need to weld or clamp the components together, reducing the possibility of stresses or non-uniformities forming during their joining. It also decreases the manual labor often involved in manufacturing existing dead-ends, permitting continuous automatic or semi-automatic manufacture to occur.

Using appropriate guides, such as rollers and wheels, the present invention manipulates a continuous flat strip or other suitable material to form both helical and non-helical sections. Feeding the strip initially to a pair of forming members, the invention permits devices of differing pitch lengths and helix diameters to be formed, for example by adjusting the angle between feed and forming axes and the distance between the forming members. Such adjustments can occur automatically, moreover, by connecting the forming members to suitable controllers. Thus, although some embodiments of the present invention contemplate forming devices having sections of identical pitch length, the invention is not so limited and may be used to produce devices of variable pitch length and helix diameter. In particular, the present invention is useful in forming insulator ties and other equipment typically associated with conductive cables.

To make a dead-end consistent with the present invention, however, one need merely feed a flat strip of material to a pair of forming rollers or other forming members. After the first helical leg of the dead-end is created, the forming rollers may be deactivated to retain a straight section of the device. During this operation other rollers may be employed to bend, or redirect, the straight section along the same axis as that of the prior helical portion. Alternatively, the first helical leg may simply be bent back to the original feed axis. In either event, maintaining the same axis of travel for both the helical and non-helical sections of the device prevents it from effectively becoming a giant flywheel as it rotates during the forming process.

The forming rollers are thereafter reactivated to form the second helical leg of the device, and a cutting mechanism may be used to separate adjacent devices. The straight section of the strip subsequently is manually or automatically bent to form the bight of the completed dead-end. If a knurled surface is desired for the dead-end, it may be formed in-line using a knurling wheel actuated hydraulically or otherwise.

The present invention has the virtue of providing devices formed of continuous segments of the strip, avoiding the need to weld, clamp, or otherwise join their component parts. so leading to improved speed and cost of manufacture and to improved physical characteristics.

Other features. and advantages of the present invention will become apparent from the remainder of the description with reference to the claims and drawings of the application.

FIG. 4 is a plan view of redirection rollers of the apparatus of FIG. 1 shown engaging a straight section of a device having both straight and helical sections.

FIG. 5 is a plan view of forming rollers shown engaging a helical section of the device of FIG. 4.

FIG. 6 is a side elevational view of a dead-end of the present invention.

FIGS. 7 and 7A are respectively, top plan and side elevational views of an insulator tie of the present invention.

FIG. 8 is a front elevational view of another insulator tie of the present invention.

Figure 1:
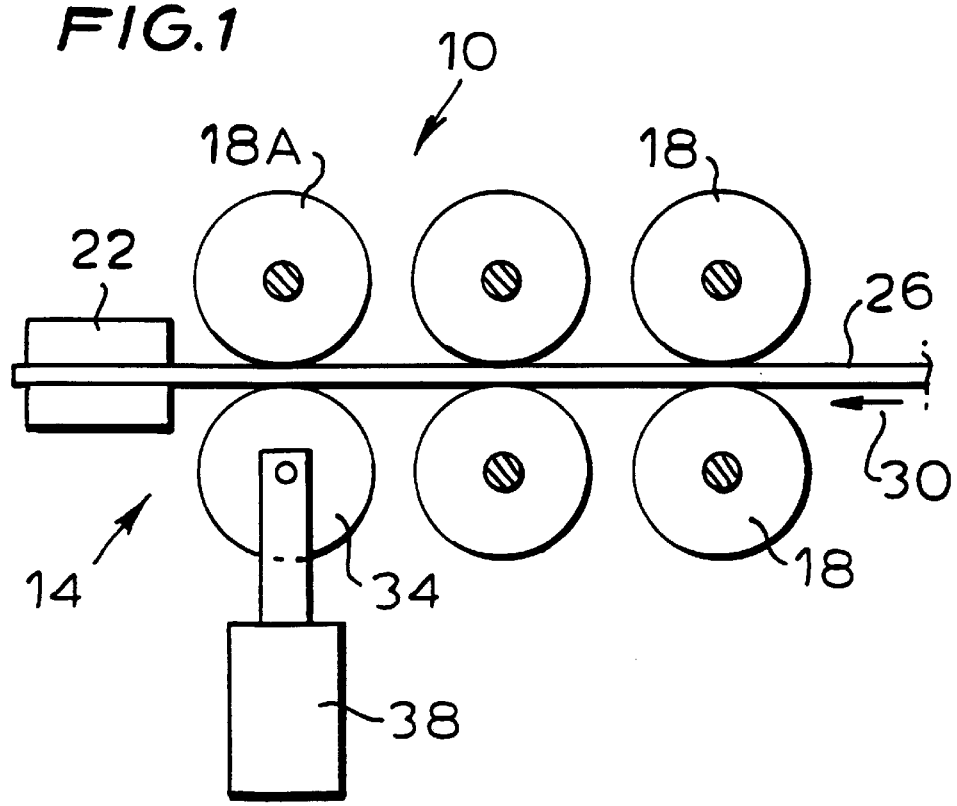
FIG. 1 is a schematic representation of apparatus of the present invention with a knurling wheel activated.
Figure 2:
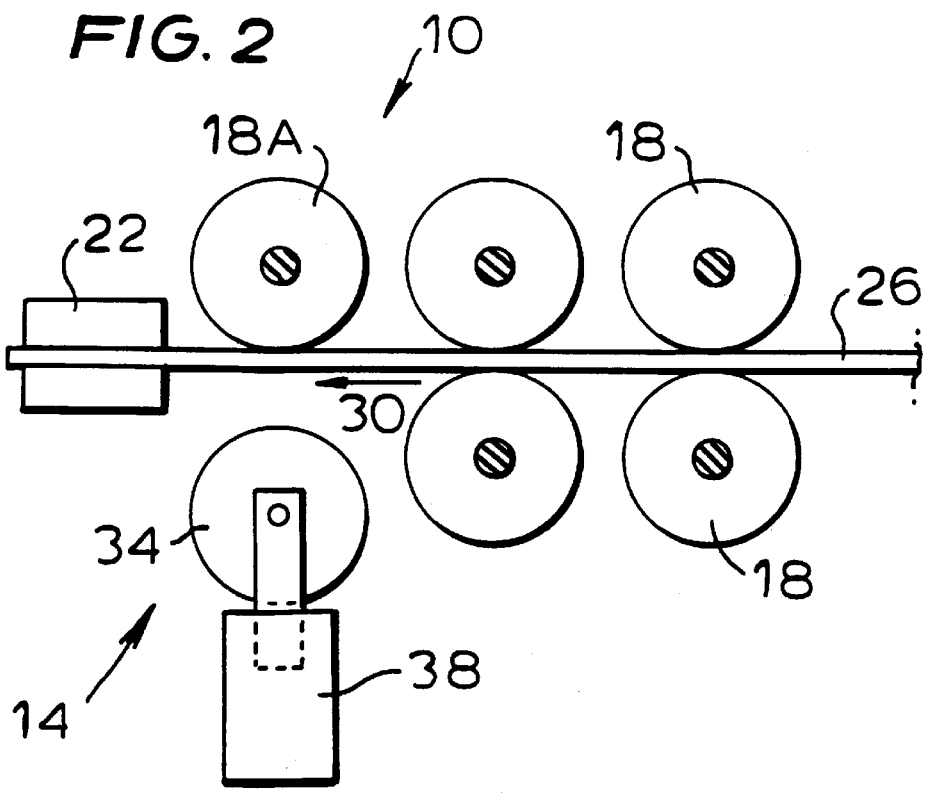
FIG. 2 is a schematic representation of the apparatus of FIG. 1 with the knurling wheel deactivated.

FIGS. 1–2 illustrate schematically apparatus 10 in accordance with the present invention. Apparatus 10 includes drive section 14. comprising one or more pairs of opposed drive wheels 18, and guides 22. The design of drive section 14 permits material 26, typically (but not necessarily) a flat strip of metal, to pass therethrough in the direction of feed arrow 30. Appropriate positioning of the drive wheels 18 and guides 22 reduces the likelihood that material 26 will buckle or otherwise deform when fed to apparatus 10. Guides 22 also may be used to straighten material 26 in one or more dimensions, thereby reducing warps and curves that might otherwise be present.

Because material 26 may be formed into articles usefull in connection with cable and wire installations knurling of at least portions of its surface may be desired. As detailed in the schematic representations of FIGS. 1–2. this knurling may be accomplished by including in apparatus 10 a retractable knurl wheel 34. In FIG. 1. knurl wheel 34 is shown contacting material 26, producing thereon knurls suitable to enhance the grip of material 26 about a cable or other object. In FIG. 2, by contrast, knurl wheel 34 is retracted so as not to contact material 26.

As illustrated in FIGS. 1–2. knurl wheel 34 may be attached to hydraulic cylinder 38 to permit such retraction. Those skilled in the art will recognized. however, that pneumatic cylinders or other actuators may be used to move knurl wheel 34 relative to material 26. Similarly. although knurl wheel 34 is shown schematically opposite drive wheel 18A and intermediate drive wheels 18 and guides 22. it may be positioned elsewhere as necessary or appropriate to achieve the sought after results.

Other apparatus may be installed to mark the strip surface, e.g. with part numbers or trade marks by any known method—for example by laser marking, printing, spraying, stamping or labelling.

Figure 3:
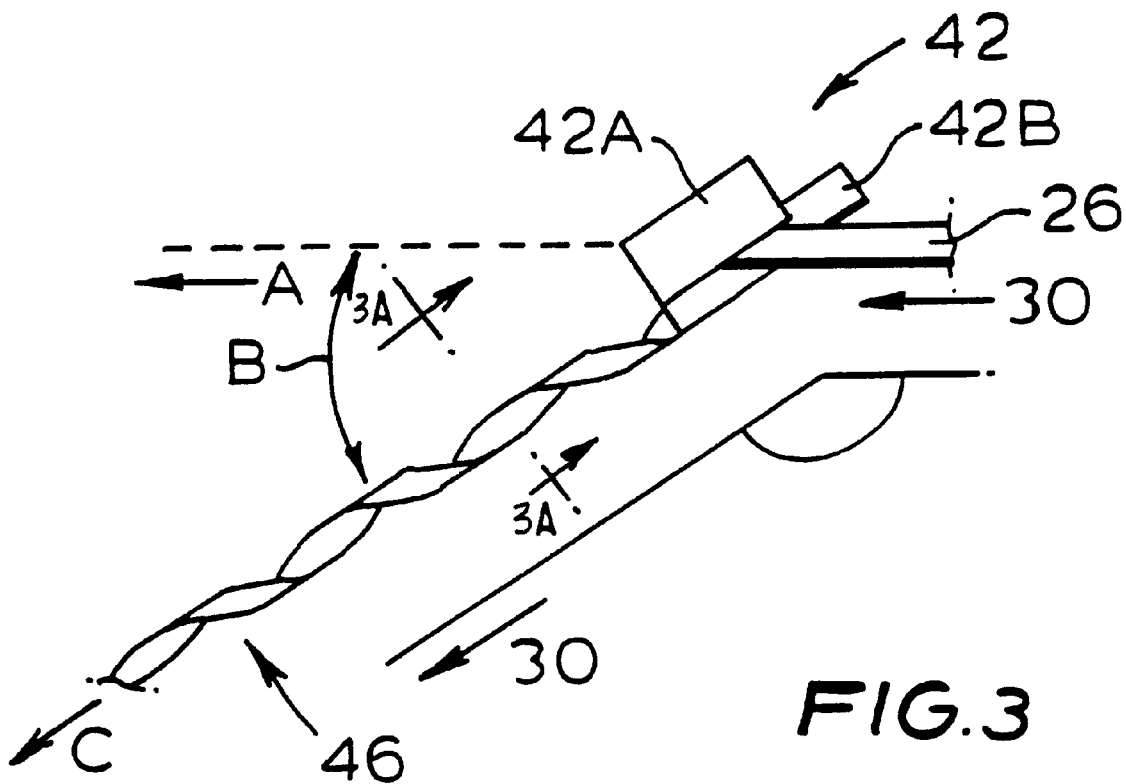
FIG. 3 is a plan view of forming rollers of the apparatus of FIG. 1.
Figure 3A:
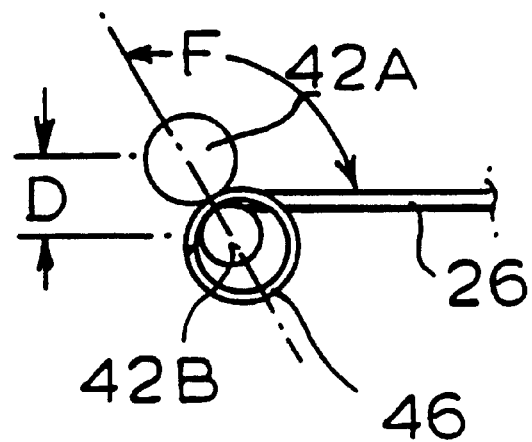
FIG. 3A is a cross-sectional view of the forming rollers taken along line A—A of FIG. 3.

Throughout drive section 14. material 26 (albeit possibly knurled or otherwise marked) remains flat. Upon exiting guides 22, however, material 26 encounters forming section 42, illustrated in FIGS. 3 and 3A as including top forming roller 42A and bottom forming roller 42B having longitudinal axis C. Like knurling wheel 34. forming rollers 42A and 42B are retractable and thus may be deactivated when desired. Alternatively. forming section 42 may comprise a single top forming roller 42A. with bottom forming roller 42B replaced by a support or, perhaps, the trailing edge or portion of guides 22.

When activated, forming rollers 42A and 42B impart a helical shape unto the material 26 passing therethrough by bending and twisting the material 26. The distance D between forming rollers 42A and 42B may determine the diameter of helix 46 formed in material 26 so that, helixes of different diameters may be formed merely by adjusting that distance D. An alternative approach is to vary the angle F between a plane containing the rotational axes of the rollers 42A and 42B and the direction of travel of material 26. This may be done in combination with adjusting distance D. Rollers 42A and 42B simultaneously change the direction of travel of material 26 by an angle B. causing material 26 to range along longitudinal axis C rather than the original feed axis A. Thus, helixes 46 of different pitch lengths may be created by adjusting the angle B between longitudinal axis C and feed axis A. By connecting forming rollers 42A and 42B to suitable controlling equipment, moreover, such adjustment of distance D and angle B may occur automatically. Moreover, by making angle B negative, helixes 46 having an opposite lay direction may be formed.

In essence as each part of the strip material is passed through the rollers it is bent away from its initial direction of travel and twisted. In the example shown in FIGS. 3 and 3A the bending is to an extent determined by the distance D and the twisting is to an extent determined by the angle B. It is this bending and twisting that produces the helix.

The shapes of products such as dead-end 50 and insulator ties 54 and 58 (see FIGS. 6, 7, 7A, and 8) are typically discontinuous. When producing these products, therefore, after helix 46 is formed a non-helical section 62 must be created in material 26. This type of discontinuity illustrates some of the limitations of the techniques described in the '491 and '397 patents, which cannot produce such products from a continuous strip.

By contrast. the present invention allows maintenance of a straight section as non-helical section 62, created by deactivating forming rollers 42A and 42B and continuing to pass material 26 through forming section 42. Although non-helical section 62 may be formed in this manner, doing so would cause helix 46 of material 26 to act like a flywheel as it rotated. Accordingly, apparatus 10 of the present invention may also include redirection rollers 66A and 66B as shown in FIG. 4. Of differing diameters. opposed rollers 66A and 66B bend. or guide. non-helical section 62 along longitudinal axis C. Alternatively, helix 46 could simply be bent back to the original feed axis A.

Like forming rollers 42A and 42B. redirection rollers 66A and 66B are retractable, permitting them to be employed as necessary during operation of apparatus 10. Those skilled in the pertinent art will recognize that servo motors, hydraulics, pneumatics, or any other suitable mechanism may be used to retract and reactivate any or all of forming rollers 42A and 42B and redirection rollers 66A and 66B. Material 26 typically does not advance through apparatus 10 while such retractions and reactivations occur, although with existing controllers these actions can be performed almost instantaneously.

Deactivating rollers 66A and 66B and reactivating forming rollers 42A and 42B produces another helix 70. Alternatively a single set of rollers may be used for this purpose and moved from a forming position to a redirection position.

Although the present invention allows formation with greater uniformity of products having helixes 46 and 70 of the same diameter and pitch length, such is not a necessary result of use of apparatus 10. Instead, as discussed above, adjusting the angle B and the distance D between forming rollers 42A and 42B permits helical devices of differing pitch lengths and helix diameters to be formed, with the adjustment occurring automatically (even during formation of a single helix 46 or 70) if desired. The portion of material 26 to be used for a dead-end 50 or an insulator tie 54 or 58 is cut after helix 70 is formed thereby producing a helical device having non-helical section 62 intermediate helixes 46 and 70 and permitting continuous formation of the next such device.

FIG. 6 illustrates a dead-end 50 of the present invention. Dead-end 50 is formed of a continuous strip of material 26 and comprises helix 46, helix 70, and non-helical section 62. Although generally straight when exiting apparatus 10, non-helical section 62 of dead-end 50 has been curved (either manually or using other equipment) to form bight 74 and so that leg 78 (comprising helix 46) is approximately parallel to leg 82 (comprising helix 70). In the particular dead-end 50 shown in FIG. 6, the pitch length of helixes 46 and 70 is 2.85" (about 72.4 mm), while the outer diameter (the sum of the helix diameter and twice the thickness of the flat strip) of each of helixes 46 and 70 is 0.457" (about 11.6 mm). The strip may be, for example. 0.05" (about 1.3 mm) to 0.5" (about 12.7 mm) thick and of a width 0.1" (about 2.5 mm) to 1" (about 25.4 mm) wide with the ratio of thickness to width between 2 and 10.

FIGS. 7 and 7A detail an exemplary insulator "top" tie 54 in which non-helical section 62 has been bent into bight 74 in the shape of an "S." Nominal pitch lengths and outer diameters for such a tie may be 5.50" (about 139.7 mm) and 1.004" (about 25.5 mm), respectively. FIG. 8 finally, shows an insulator "side" tie 58 of the present invention. In insulator tie 58. non-helical section 62 has been bent through approximately 300 to form bight 74. This produces a nominal angle E of approximately 120 between legs 78 and 82. Exemplary pitch lengths and outer diameters for helixes 46 and 70 of tie 58 are, respectively, 4.00" (about 101.6 mm) and 0.683" (about 17.3 mm).

In use, legs 78 and 82 typically wrap around a conductor or other cable to grip it securely. If present, the knurled surfaces of legs 78 and 82 may enhance the grip and thereby provide an even more effective product. As noted above, the helical products of the present invention may be formed of a continuous strip of material (whether flat, round, or otherwise) and are not limited to two-legged devices such as dead-ends and insulator ties. Instead, the invention contemplates production of virtually any elongated device intended to have one or more discontinuities along its length.

What is claimed is:

1. A method for forming helical sections in strip material, the method comprising the steps of:

a) feeding the strip material in a first direction to contact a pair of forming members, the strip material passing from one side of the pair of forming members, through and between the pair of forming members, to exit from the other side of the forming members; and b) the forming members acting to bend the strip therebetween by an amount of bending and twist the strip therebetween by an amount of twisting to form a helical section leaving the forming members in a second direction disposed from the first direction by an angle, the amount of bending determining the diameter of the helix and the amount of twisting determining the helical angle of the helix.

2. A method as claimed in claim 1 in which the amount of twisting is determined by the angle between the first and second directions.

3. A method as claimed in claim 1 in which the forming members comprise a pair of spaced rollers (42A, 42B) with rotational axes angularly disposed to the first direction to lie parallel with the second direction.

4. A method as claimed in claim 1 in which the forming members may be selectively disabled so as to selectively produce a non-helical section from the strip material adjacent a helical section.

5. A method as claimed in claim 3 in which the spacing between the rollers is selectively variable to alter the amount of bending.

6. A method as claimed in claim 3 in which an angle between a plane containing the rotational axes of the rollers and the first direction is selectively variable to vary the amount of bending.

7. A method as claimed in claim 3 in which an angle of disposition of the rotational axes of the spaced rollers to the first direction, and thereby the angle between the first and second directions, is selectively variable to vary the amount of twisting.

8. A method as claimed in claim 5 in which the spacing between the rollers is varied while forming a helix so that the diameter of said helix is varied.

9. A method as claimed in claim 6 in which the angle between a plane containing the rotational axes of the rollers and the first direction is varied while forming a helix so that the diameter of said helix is varied.

10. A method as claimed in claim 7 in which the angle of disposition of the rotational axes of the spaced rollers to the first direction, and thereby the angle between the first and second directions, is varied while forming a helix so that the pitch of said helix is varied.

11. Apparatus for forming helical sections in strip material, comprising:
   a) a pair of forming members;
   b) means for feeding the strip material in a first direction to contact and pass through and between the pair of forming members, the pair of forming members being operable to bend and twist the strip material therebetween to form a helical section leaving the forming in a second direction, the angle between the first and second directions determining the helical angle of the helical section;
   c) the forming members being disposed to operate such that in use the strip material passes from one side of the pair of forming members, through and between the pair of forming members, to exit from the other side of the pair of forming members.

12. Apparatus as claimed in claim 11 in which the forming members comprise a pair of spaced rollers with rotational axes angularly disposed to the first direction to lie parallel with the second direction.

13. Apparatus as claimed in claim 8 in which the forming members may be selectively disabled so as to selectively produce a non-helical section from the strip material adjacent a helical section.

14. Apparatus as claimed in claim 12 in which the spacing between the rollers is selectively variable to alter the amount of bending.

15. Apparatus as claimed in claim 9 in which an angle between a plane containing the rotational axes of the rollers and the first direction is selectively variable to vary the amount of bending.

16. Apparatus as claimed in claim 9 in which an angle of disposition of the rotational axes of the spaced rollers to the first direction, and thereby the angle between the first and second directions, is selectively variable to vary the amount of twisting.

17. Apparatus as claimed in claim 14 in which the spacing between the rollers is variable while forming a helix so that the diameter of said helix is variable.

18. Apparatus as claimed in claim 15 in which the angle between a plane containing the rotational axes of the rollers and the first direction is variable while forming a helix so that the diameter of said helix is variable.

19. Apparatus as claimed in claim 16 in which the angle of disposition of the rotational axes of the spaced rollers to the first direction, and thereby the angle between the first and second directions, is variable while forming a helix so that the pitch of said helix is variable.

20. A method of producing helical devices comprising a first helical section, a second non-helical section, and a third helical section, the method comprising the steps of:
   a) feeding strip material having integrally formed first, second and third sections to an apparatus;
   b) within the apparatus automatically activating helix forming means to form the first section into the shape of a helix;
   c) within the apparatus automatically inactivating the helix forming means so as not to form the second section into the shape of a helix;
   d) within the apparatus automatically activating the helix forming means so as to form the third section into the shape of a helix;
   e) cutting the first section, second section, and third section from the strip material to form a first helical device; and
   f) repeating steps a)–e) to form a second helical device the cutting of the preceding step e) severing the third section of the first helical device from the first section of the second helical device.

21. A method as claimed in claim 20 which includes the step of bending the second section into a curve.

22. A method as claimed in claim 14 including the step of knurling the strip material.

23. A method as claimed in claim 20 in which the helix-forming means is selectively varied while forming a helical section so that the diameter of said helical section is varied.

24. A method as claimed in claim 20 in which the helix-forming means is selectively varied while forming a helical section so that the pitch of said helical section is varied.

25. A method of producing helical devices comprising a first helical section, a second non-helical section, and a third helical section, the method comprising the steps of:
   a) feeding strip material having integrally formed first, second, and third sections to an apparatus;
   b) within the apparatus automatically operating helix-forming means to form the first section into the shape of a helix;
   c) within the apparatus automatically deactivating the helix-forming means so as not to form the second section into the shape of a helix;
   d) within the apparatus automatically activating the helix-forming means so as to form the third section into the shape of a helix and thereby form a first helical device;
   e) repeating steps a)–d) to form a second helical device connected to the first helical device; and
   f) using a cutting mechanism to disconnect the first and second helical devices.

26. A method according to claim 25 in which the helix-forming means is selectively varied while forming a helical section so that the diameter of said helical section is varied.

27. A method as claimed in claim 25 in which the helix-forming means is selectively varied while forming a helical section so that the pitch of said helical section is varied.

28. A method as claimed in claim 25 further comprising the step of bending the second section into a curve.

29. A method as claimed in claim 25 further comprising the step of knurling the strip material.

* * * * *

UNITED STATES PATENT AND TRADEMARK OFFICE
CERTIFICATE OF CORRECTION

PATENT NO. : 5,927,125
DATED : July 27, 1999
INVENTOR(S) : Maurice William Murphy It is certified that error appears in the above-indentified patent and that said Letters Patent is hereby corrected as shown below:

On the cover page under Foreign Application Priority Data insert
--Apr. 3, 1995 [TW] Taiwan...................84104482-- as the first entry On the cover page insert the heading --Related U.S. Application Data--.

On the cover page under Related U.S. Application Data insert --Continuation-in-part of Serial No. 08/334,136, Nov. 4, 1994, Pat. No. 5,586,461. --

Column 7, line 29, claim 13, insert --are capable of being-- after members.

Signed and Sealed this

Thirteenth Day of June, 2000

Attest:

Q. TODD DICKINSON

*Attesting Officer*                    *Director of Patents and Trademarks*